United States Patent
Takano et al.

(10) Patent No.: US 9,900,035 B2
(45) Date of Patent: Feb. 20, 2018

(54) DETECTION APPARATUS, RECEIVING APPARATUS, AND DETECTION METHOD

(71) Applicants: FUJITSU TEN LIMITED, Kobe-shi, Hyogo (JP); TOYOTA JIDOSHA KABUSHIKI KAISHA, Toyota-shi, Aichi-ken (JP)

(72) Inventors: Kosuke Takano, Kobe (JP); Takuma Sawaya, Nagoya (JP)

(73) Assignees: FUJITSU TEN LIMITED, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/160,599

(22) Filed: May 20, 2016

(65) Prior Publication Data

US 2016/0352371 A1  Dec. 1, 2016

(30) Foreign Application Priority Data

May 28, 2015 (JP) ................................. 2015-109097

(51) Int. Cl.
   *H04B 1/16* (2006.01)

(52) U.S. Cl.
   CPC ...................................... *H04B 1/16* (2013.01)

(58) Field of Classification Search
   CPC ........................................................ H04B 1/16
   USPC .......................... 455/337, 112, 118, 119, 131
   See application file for complete search history.

(56) References Cited

U.S. PATENT DOCUMENTS

| 4,968,981 A | 11/1990 | Sekine et al. |
| 8,243,776 B2 | 8/2012 | Tanaka et al. |
| 8,503,510 B2 * | 8/2013 | Tanaka ..................... G01S 19/13 327/551 |
| 8,804,791 B2 | 8/2014 | Tanaka et al. |
| 2005/0029982 A1 * | 2/2005 | Stancu ..................... H02M 1/12 318/801 |
| 2008/0080599 A1 * | 4/2008 | Kang ......................... G01S 7/03 375/219 |
| 2009/0219201 A1 * | 9/2009 | Martin ..................... G01S 19/23 342/357.62 |
| 2010/0309952 A1 * | 12/2010 | Asami ..................... G01R 23/20 375/132 |
| 2016/0352371 A1 * | 12/2016 | Takano ..................... H04B 1/16 |

FOREIGN PATENT DOCUMENTS

| JP | S61-186037 A | | 8/1986 |
| JP | 07181243 A | * | 7/1995 |
| JP | H07-181243 A | | 7/1995 |
| JP | H08-3525 B2 | | 1/1996 |
| JP | 2003-163603 A | | 6/2003 |

(Continued)

*Primary Examiner* — Md Talukder
(74) *Attorney, Agent, or Firm* — Oliff PLC

(57) ABSTRACT

A detection apparatus according to an embodiment includes an acquisition unit, a calculation unit, and a detection unit. The acquisition unit acquires, via an antenna positioned on a movable body, data on which signal groups with different base frequencies are superimposed. The calculation unit calculates, based upon a frequency spectrum of the data acquired by the acquisition unit, the base frequencies of the respective signal groups. The detection unit detects signals in the respective signal groups based upon the base frequencies calculated by the calculation unit.

7 Claims, 6 Drawing Sheets

(56) References Cited

FOREIGN PATENT DOCUMENTS

| JP | 2009-206603 | A | | 9/2009 |
|---|---|---|---|---|
| JP | 2009206603 | A | * | 9/2009 |
| JP | 2013-529429 | A | | 7/2013 |

* cited by examiner

DETECTION APPARATUS, RECEIVING APPARATUS, AND DETECTION METHOD

CROSS-REFERENCE TO RELATED APPLICATION

This application is based upon and claims the benefit of priority of the prior Japanese Patent Application No. 2015-109097, filed on May 28, 2015, the entire contents of which are incorporated herein by reference.

FIELD

The embodiment discussed herein is directed to a detection apparatus, a receiving apparatus, and a detection method.

BACKGROUND

Conventionally, a detection apparatus is known which takes the Fourier transform of received data with a plurality of noise signals and compares peak intensities in a resultant spectrum with a predetermined threshold so as to detect noise signals severally.

Literatures related to the aforementioned conventional technology include, for example, Japanese Laid-Open Patent Publication No. 2009-206603.

However, in the aforementioned conventional technology, there are still extra matters to further improve in view of accurately detecting the noise signals. For example, with the aforementioned conventional technology, it is hard to determine an appropriate threshold when a difference of the peak intensities between noise signals and other signals in the spectrum is minute, which is prone to a degradation of the accuracy of noise signal detection. The problem similarly arises in detecting various signals not limited to the noise signals.

SUMMARY

According to an aspect of an embodiment, a detection apparatus includes an acquisition unit, a calculation unit and a detection unit. The acquisition unit configured to acquire, via an antenna positioned on a movable body, data on which signal groups with different base frequencies are superimposed. The calculation unit configured to calculate, based upon a frequency spectrum of the data acquired by the acquisition unit, the base frequencies of the respective signal groups. The detection unit configured to detect signals included in the respective signal groups based upon the base frequencies calculated by the calculation unit.

BRIEF DESCRIPTION OF DRAWINGS

A more complete appreciation of the invention and many of the associated advantages thereof will be readily understood by reference to the following detailed description when considered in connection with the accompanying drawings.

DESCRIPTION OF EMBODIMENTS

Hereinafter, a detection apparatus, a receiving apparatus, and a detection method according to an embodiment of the present disclosure will be described in detail with reference to the accompanying drawings. It is not intended that the present invention be limited to the embodiment described below. Also, in the following, an outline of the detection method according to the embodiment is described with reference to FIG. 1, and thereafter, the embodiment of the detection apparatus and the receiving apparatus to which the detection method according to the embodiment is applied are described with reference to FIG. 2 to FIG. 8.

1. Outline of Detection Method

Figure 1:
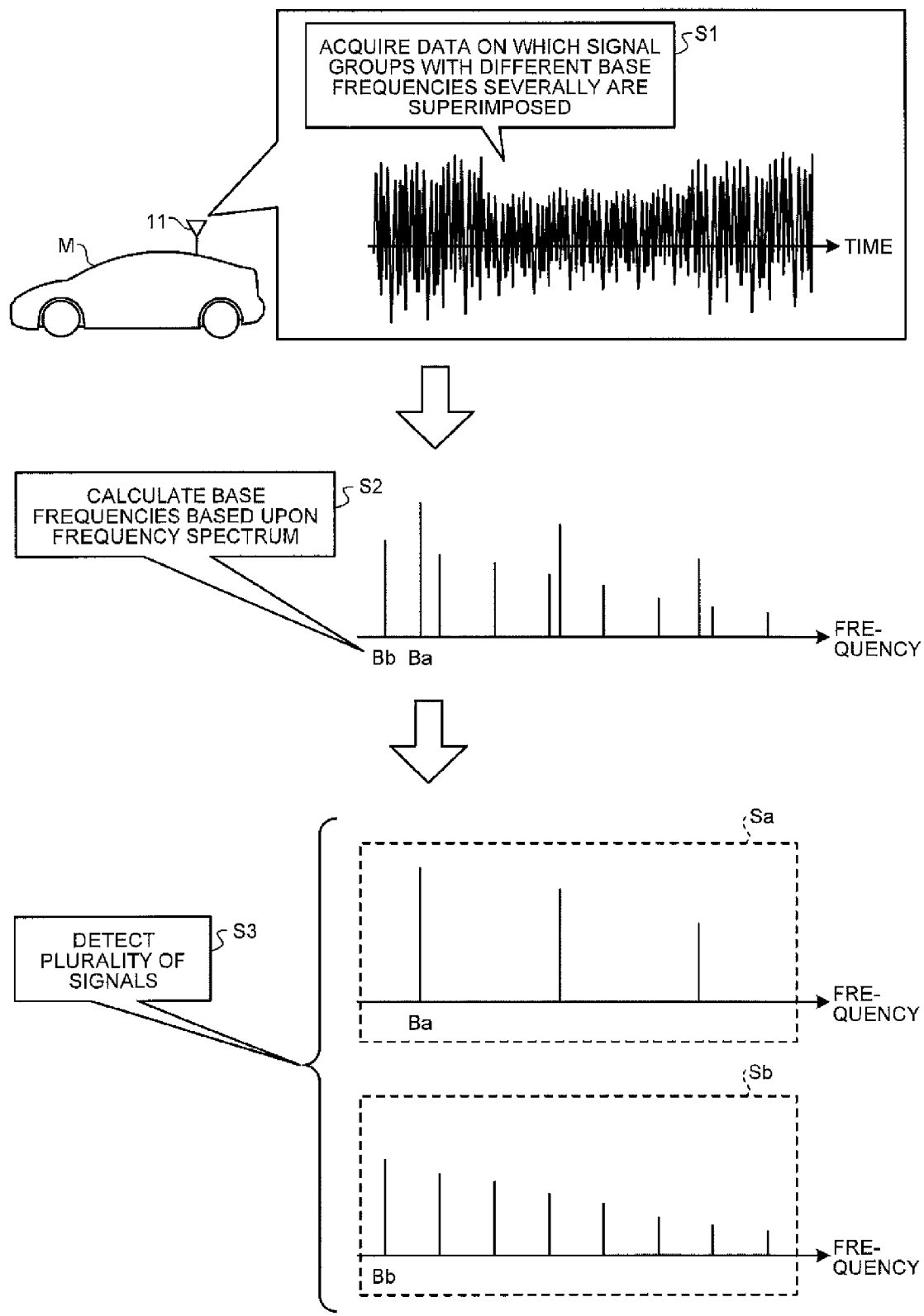
FIG. 1 is a diagram illustrating an outline of a detection method according to an embodiment.

First, the outline of a detection method according to an embodiment will be described with reference to FIG. 1. FIG. 1 is a diagram illustrating the outline of the detection method according to the embodiment. The detection method illustrated in FIG. 1 is that of detecting signals included in respective signal groups from data on which the signal groups with different base frequencies are superimposed.

Although, in FIG. 1, a case where a movable body M is a vehicle is illustrated by way of example, the movable body M is not limited to a vehicle. For example, the movable body M may be any of things that users get on, board, drive, or do anything else on, including a train, a ship, an aircraft, and the like.

Also, in the following, for the convenience of description, signals in signal groups of different base frequencies are described as noise, but the signals are not limited to the noise. The signal groups may alternatively be some other signal groups superimposed on a certain signal or a part of a certain signal. Further, although, in the following, a case where two signals of different base frequencies are superimposed will be described by way of example, the number of the signals is not limited to that. In addition, "frequency spectrum" stated in the following refers to a graph representing intensity (level) with respect to frequency in association with data and signals contained in the data.

As illustrated in FIG. 1, an antenna 11 is positioned on the movable body M. The antenna 11 receives radio waves such as incoming airwaves for radio broadcasting or the like, and a variety of radio waves transmitted in other systems.

The radio waves received by the antenna 11 are sometimes led to a degradation of signal-receiving quality because of noises superimposed thereon. The noises include so-called "periodic noise" that is a composite of a fundamental wave of a base frequency and harmonic waves whose frequencies are obtained by multiplying the base frequency by integers of two or more. The periodic noise, for example, in the context that the movable body M is a hybrid vehicle, includes a switching noise from a power converting device such as an inverter, a DC-DC converter, or the like.

What has conventionally been common is a method of taking the Fourier transform of data including a plurality of noise signals and comparing peak intensities in the resultant frequency spectrum with a predetermined threshold so as to detect the noise signals severally.

However, with the conventional method, it is difficult determining an appropriate threshold when a difference of the peak intensities between noise signals and other signals in the frequency spectrum is minute, which is prone to a degradation of the accuracy of noise detection. The difficulty in determining the threshold is further increased when the data contains more than one noise signals. Also, in the conventional method, the peak intensities in the frequency spectrum are compared with the threshold, and therefore, it is hard to detect, with high accuracy, periodic noises containing frequency components of various intensities.

To deal with this, the detection method according to the embodiment is adapted to calculate base frequencies of the periodic noises included in the data and detect the periodic noises severally based upon the calculated base frequencies. In this way, the accuracy of periodic noise detection can be enhanced even when the data contains more than one periodic noises.

In the following, a procedure of executing the detection method according to the embodiment will be described. In the detection method according to the embodiment, data on which periodic noises (signal groups) with different base frequencies are superimposed is acquired via the antenna 11 located on the movable body M (Step S1).

Subsequently, in the detection method according to the embodiment, the base frequencies (see "base frequencies Ba and Bb" in FIG. 1) of the periodic noises are calculated based upon the frequency spectrum obtained by taking the Fourier transform of the data (Step S2). Details of the base frequency detection method stated here will be discussed later with reference to FIG. 4 and FIG. 5.

Further, in the detection method according to the embodiment, the periodic noises are detected based upon the calculated base frequencies Ba and Bb, respectively (Step S3). In FIG. 1, the periodic noise of the base frequency Ba is denoted by a signal group Sa, and the periodic noise of the base frequency Bb is denoted by a signal group Sb. The details of the periodic noise detection method stated so far will also be discussed later with reference to FIG. 6.

In this way, the detection method according to the embodiment involves calculating the base frequencies of the periodic noises from the data on which the signal groups with different base frequencies are superimposed and then detecting the periodic noises based upon the calculated respective base frequencies. Thus, in accordance with the detection method according to the embodiment, signals, such as noise signals, superimposed on data can be detected with high accuracy.

In the following, details of the detection method already stated with reference to FIG. 1 and the embodiment of the detection apparatus and the receiving apparatus to which the detection method is applied will be specifically discussed. In the following, a case where the receiving apparatus includes the so-called on-vehicle noise detection apparatus already discussed with reference to FIG. 1 will be described by way of example.

2. Configuration of Receiving Apparatus

Figure 2:
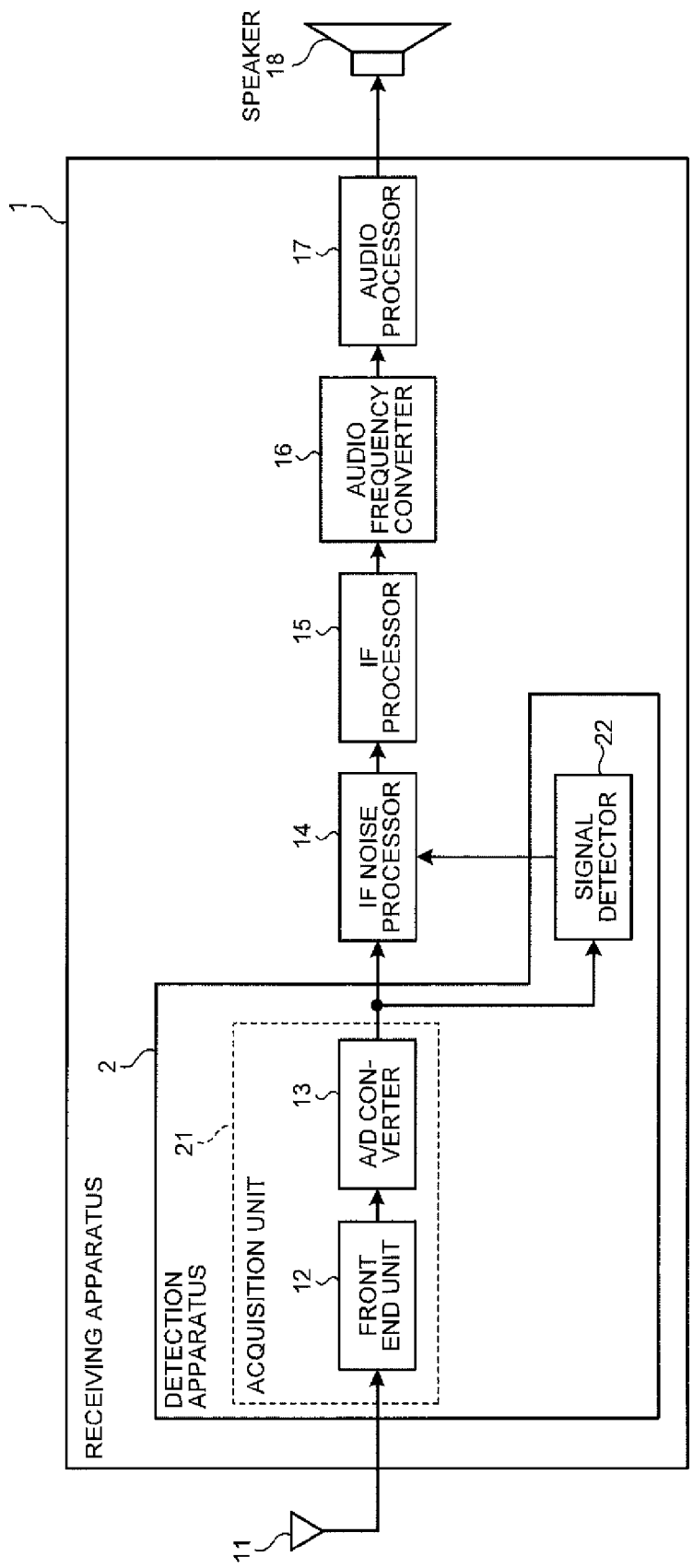
FIG. 2 is a block diagram illustrating an inner configuration of a receiving apparatus according to the embodiment.

FIG. 2 is a block diagram illustrating an inner configuration of a receiving apparatus 1 according to the embodiment. In this drawing, elements essential for explaining the characteristics of the receiving apparatus 1 are illustrated, and generic elements are omitted from the illustration.

The receiving apparatus 1 illustrated in FIG. 2 corresponds to a receiving apparatus such as an AM broadcasting receiver or an FM broadcasting receiver that receives airwaves such as radio broadcasting or television broadcasting, and is connected to the antenna 11 and a speaker 18. The receiving apparatus 1 includes a detection apparatus 2, an IF noise processor 14, an IF processor 15, an audio frequency converter 16, and an audio processor 17. The detection apparatus 2 includes an acquisition unit 21 and a signal detector 22. The acquisition unit 21 includes a front end unit 12 and an A/D converter 13.

The acquisition unit 21 acquires via the antenna 11 the data on which the periodic noises with different base frequencies are superimposed. Specifically, the front end unit 12 converts airwaves received via the antenna 11 to an intermediate frequency signal (hereinafter, simply "IF signal"). The A/D converter 13 converts the IF signal to a digital signal. Although, so far, it has been stated that the A/D converter 13 converts the IF signal to a digital signal, the A/D converter 13 may, without limitation to the statement, convert the RF signal before undergoing the IF conversion to a digital signal.

The signal detector 22 detects the periodic noises in IF signals (i.e., the data) sequentially acquired via the A/D converter 13. Then, the signal detector 22 outputs signals containing the base frequencies of the periodic noises to the IF noise processor 14. Details of the processing executed by the signal detector 22 will be discussed later with reference to FIG. 3 to FIG. 6.

The IF noise processor 14 performs a blanking process for removing noise components in the digitized IF signals based upon the signals from the signal detector 22. The blanking process corresponds to interpolation for removing a section to be removed that includes noise components among continuous signal sections of the IF signals, and performing signal interpolation on the removed section. The IF noise processor 14 is an example of a removal unit.

The IF processor 15 performs a digital filtering process on the digitized IF signals. The digital filtering process corresponds to a filtering process for removing IF signals of broadcasting frequencies adjacent to a broadcasting frequency of the incoming airwaves as a disturbing signal.

The audio frequency converter 16 converts the digitally filtered IF signals to audio frequency signals (referred to simply as "audio signals" hereinafter). The audio processor 17 performs audio processing on the audio signals. The audio processing corresponds to audio mute processing or high-frequency cutoff processing for removing high-frequency components. The speaker 18 acoustically outputs the audio signals having undergone the audio processing. Portions such as the A/D converter 13 and its subsequent elements up to the audio processor 17 are constituted by, for example, a digital signal processor (DSP); however, these are not limited to a DSP.

The aforementioned IF conversion is not necessarily essential, and the front end unit may perform a process of extracting desired frequencies. In this case, the desired frequencies correspond to a frequency range broad to some extent such as the AM band or the FM band, or the entire TV broadcasting band.

3. Configuration of Signal Detector and Specific Operation of Detection Process

Figure 3:
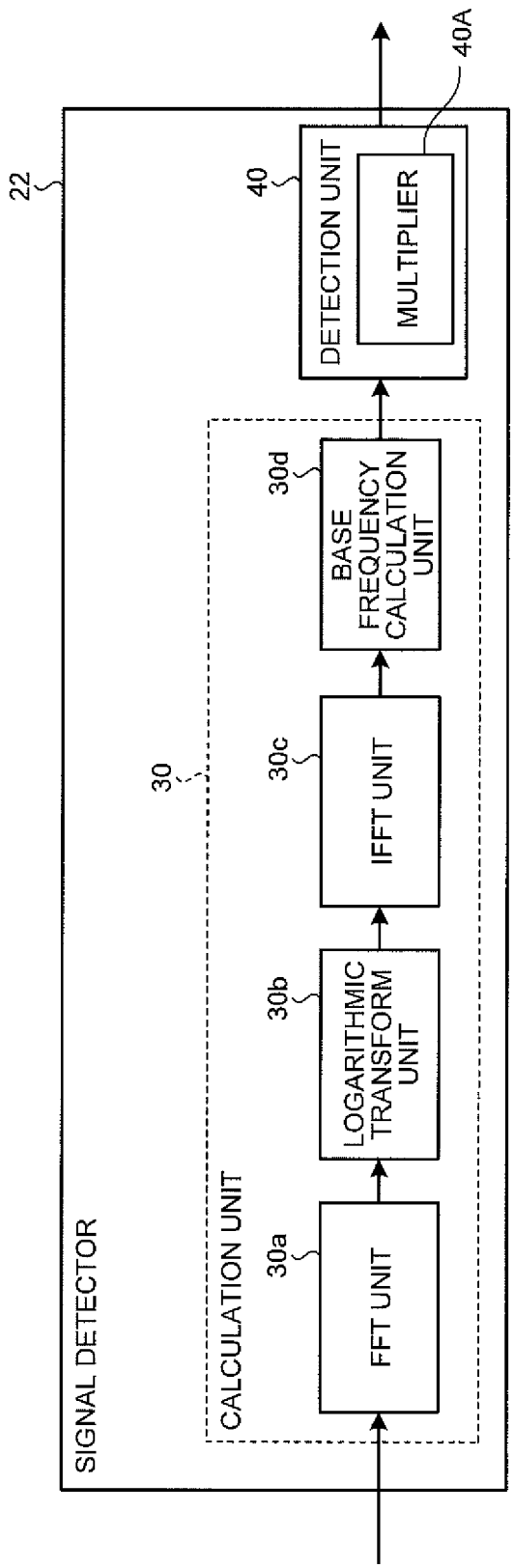
FIG. 3 is a block diagram illustrating an inner configuration of a signal detector.
Figure 4:
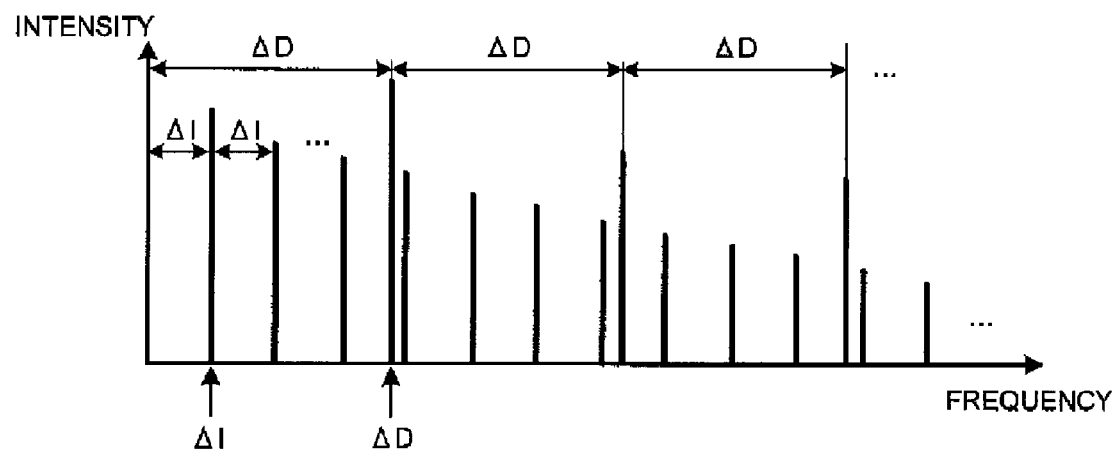
FIG. 4 is a (first) explanatory diagram illustrating the detection method for signals.
Figure 5:
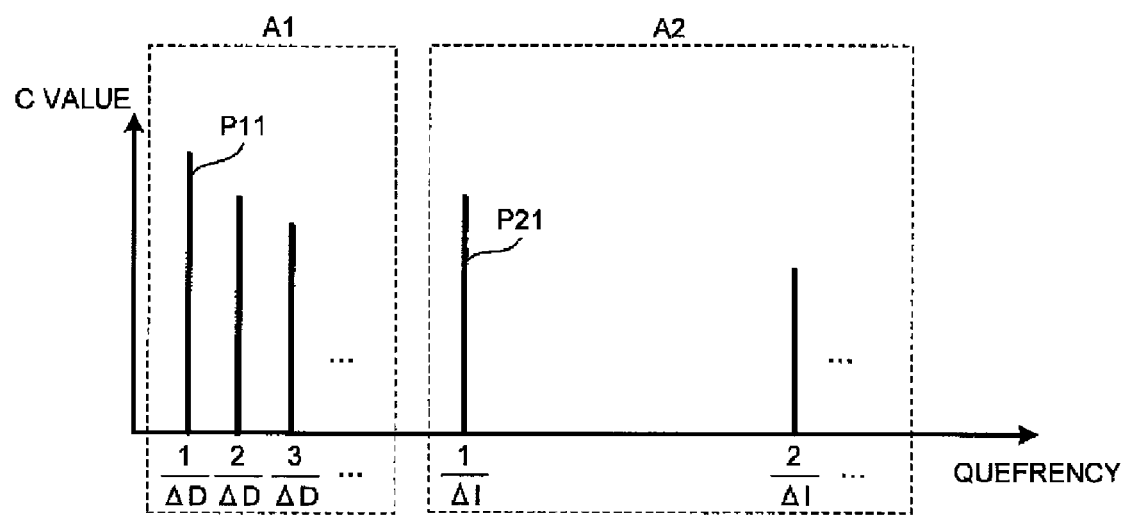
FIG. 5 is a (second) explanatory diagram illustrating the detection method for the signals.
Figure 6:
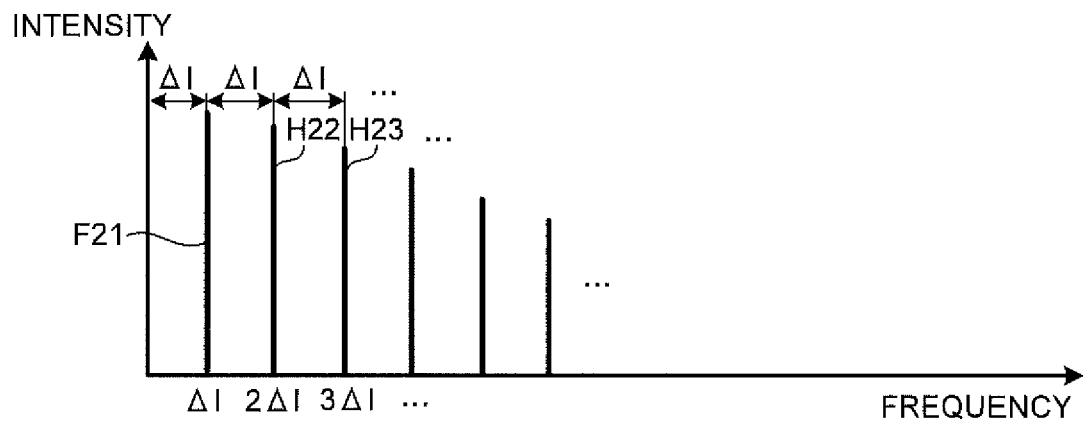
FIG. 6 is a diagram illustrating an example of a signal group detected by a detection unit.

Hereinafter, details of a configuration of the signal detector 22 and the process executed by the signal detector 22 will be discussed with reference to FIG. 3 to FIG. 6. FIG. 3 is a block diagram illustrating an inner configuration of the signal detector 22. FIG. 4 and FIG. 5 are (first and second) explanatory diagrams illustrating the detection method for signals. FIG. 6 is a diagram illustrating an example of a signal group detected by the detection unit. The Fourier transform stated below includes the DFT (Discrete Fourier Transform) that handles discretized information, as well. Also in the following, a case where two periodic noises are superimposed on data will be discussed by way of example, but the periodic noises superimposed on the data may be three or more in number.

The signal detector 22 illustrated in FIG. 3 includes a calculation unit 30 and a detection unit 40. The calculation unit 30 includes an FFT (Fast Fourier Transform) unit 30a, a logarithmic transform unit 30b, an IFFT (Inverse Fast Fourier Transform) unit 30c, and a base frequency calculation unit 30d.

The calculation unit 30 performs a so-called "cepstral operation" on a signal that is obtained by removing frequency components of carrier waves in the radio waves for broadcasting from the digitized IF signal, for example. The cepstral operation herein refers to a signal processing operation where an analysis on a signal with a plurality of signals superimposed is executed to separate the signals. The calculation unit 30 performs the cepstral operation on the IF signal by performing Fourier transform, logarithm transform, and inverse Fourier transform in series.

Specifically, the FFT unit 30a calculates, as illustrated in FIG. 4, a frequency spectrum by taking the Fourier transform of the signal resulting from removal of frequency components of carrier waves in the IF signal and then outputs the frequency spectrum to the logarithmic transform unit 30b. The vertical axis for the frequency spectrum in FIG. 4 denotes the "intensity (level) in the spectrum" (referred to as "intensity" hereinafter), and the horizontal axis denotes the frequency. In FIG. 4, a case where two periodic noises having base frequencies of $\Delta I$ and $\Delta D$ ($>\Delta I$), respectively, are superimposed is illustrated by way of example.

In this case, the frequencies of harmonic components in the periodic noises are frequencies obtained by multiplying the base frequency by integers of two or more. Thus, the periodic noises are represented in the frequency spectrum as groups of peaks that are at frequency intervals identical with the respective base frequencies. The periodic noises have their respective peak intensities gradually diminished as the frequencies are increased.

Specifically, as illustrated in FIG. 4, first and second groups of peaks are superimposed. The peaks in the first group are in line at frequency intervals of $\Delta I$ from the base frequency $\Delta I$ and are gradually diminished in intensity as the frequency is increased. The peaks in the second group are in line at frequency intervals of $\Delta D$ from the base frequency $\Delta D$ and are gradually diminished in intensity as the frequency is increased.

The logarithmic transform unit 30b calculates a "logarithmic amplitude spectrum" by taking a logarithm transform of the frequency spectrum after a square operation and an absolutizing operation, and then outputs the logarithmic amplitude spectrum to the IFFT unit 30c. The IFFT unit 30c calculates "cepstral values" (referred to as "C values" hereinafter) by taking the inverse Fourier transform of the logarithmic amplitude spectrum and then outputs the C values to the base frequency calculation unit 30d. "Cepstrum" in the following discussion refers, as illustrated in FIG. 5, to a graph of the C values represented relative to a variable (i.e., quefrency) with a time dimension. Specifically, the vertical axis for the cepstrum illustrated in FIG. 5 indicates the C values, and the horizontal axis indicates the quefrency.

In the cepstrum, periodic signals are converted to groups of peaks. The peaks of each group are in line at constant intervals from the quefrency of a multiplicative inverse to the base frequency in the corresponding periodic signal and are gradually diminished in C value as the quefrency is increased. In addition, the intervals between the peaks in the group are equal to the multiplicative inverse to the base frequency in the periodic signal.

Specifically, as illustrated in FIG. 5, in the frequency spectrum, the periodic noise having the base frequency of $\Delta I$ is converted to a group of peaks that are in line at intervals of $1/\Delta I$ from the quefrency of $1/\Delta I$ and are gradually diminished in C value as the quefrency is increased. Also, the periodic noise having the base frequency of $\Delta D$ is converted to a group of peaks that are in line at intervals of $1/\Delta D$ from the quefrency of $1/\Delta D$ and are gradually diminished in C value as the quefrency is increased. Thus, in accordance with the cepstral operation, the groups of peaks of the periodic noises of different base frequencies can be split into respectively separate quefrency positions. FIG. 5 illustrates the two periodic noises split in this manner as signal groups A1 and A2.

Further, as mentioned above, in accordance with the cepstral operation, the peaks of the quefrencies of $1/\Delta I$ and $1/\Delta D$ are peaks that have the greatest C values in the groups those peaks severally belong to. To deal with this, the base frequency calculating unit 30d calculates the base frequencies from the quefrencies at which the signals in the signal groups A1 and A2 have the greatest C values (see "peaks P11 and P21" in FIG. 5). In this way, the base frequency of each frequency noise can be calculated with high accuracy.

The method of detecting the peak having the greatest C value from each of the signal groups A1 and A2 includes a method of comparing the C values of the peaks sequentially, for example, in ascending order of the quefrency. Specifically, two peaks adjacent to each other are compared, and when the C value of one peak at a greater quefrency is greater, by a predetermined value or more, than the C value of the other peak at a smaller quefrency, it is decided that the peak at the greater quefrency is the greatest peak in each of the signal groups A1 and A2.

The quefrency-to-frequency conversion may be performed by taking multiplicative inverses to quefrencies or by taking an operation including the Fourier transform of a part of the cepstrum to inversely convert the part to a logarithmic amplitude spectrum or a frequency spectrum.

As has been seen, the detection apparatus 2 according to the embodiment performs a cepstral operation of the data acquired via the antenna 11 positioned on the movable body M. In this way, it becomes possible to split a plurality of periodic noises severally by an arithmetic operation not complicated and in no need of processing ability. Thus, with the simplified operation, it is possible to enhance the accuracy of detecting the periodic noises.

Also, the detection apparatus 2 detects the base frequencies of the periodic noises first. In this way, when the frequencies of the periodic noises vary, it is possible to detect the periodic noises, following the frequency variation. Thus, when the frequencies of the periodic noises vary because of the operation states as is the case of switching noise of a power converter in a hybrid vehicle, for example, it is possible to detect the periodic noises with high accuracy, following the frequency variation.

The power converter includes, for example, an inverter that converts electric power between DC and AC, a DC-DC converter that converts to DC that has its voltage raised or dropped to a predetermined voltage level.

Also, as to the detection apparatus 2 according to the embodiment, a noise source is out of concern. Thus, the detection apparatus 2 is capable of detecting periodic noises contained, for example, in floor noise of an electric circuit or noise from an engine. In addition, it is possible detecting periodic noises from a noise source outside the movable body M.

Next, a process executed by the detection unit 40 will be discussed. The detection unit 40 illustrated in FIG. 3 performs a multiplication process on the base frequencies calculated by the base frequency calculation unit 30d and then outputs the results together with the signals containing the base frequencies to the IF noise processor 14 (see FIG. 2). The multiplication process refers to a process of multiplying each of the base frequencies by integers of two or more. The multiplication process is carried out by a multiplier 40A of the detection unit 40.

The multiplier 40A multiplies each of the base frequencies $\Delta I$ and $\Delta D$ calculated by the base frequency calculation unit 30d, by integers of two or more, and then calculates the multiplied frequencies, $2\Delta I$, $3\Delta I$, etc., and $2\Delta D$, $3\Delta D$, etc. In other words, the frequencies of the harmonic components relative to the fundamental waves of the base frequencies $\Delta I$ and $\Delta D$ are calculated. Subsequently, the detection unit 40 outputs to the IF noise processor 14 the frequencies of the harmonic components of the base frequencies $\Delta I$ and $\Delta D$ (i.e., the frequencies $2\Delta I$, $3\Delta I$, etc., and $2\Delta D$, $3\Delta D$, etc. after undergoing the multiplication) together with the base frequencies $\Delta I$ and $\Delta D$.

The IF noise processor 14 performs a blanking process by removing from the IF signal the frequency components detected by the detection unit 40. The IF noise processor 14 may be configured to include a notch filter, for example.

As has been seen, the detection apparatus 2 according to the embodiment performs a multiplication process on the base frequencies of the signals. In this way, with the simplified process, it is possible to detect the frequencies of the signals over the frequency bands. Thus, it is possible to simplify the apparatuses and circuits, in comparison with a case where frequencies of signals are detected by scanning the whole of the frequency bands.

In the aforementioned example, the case where the base frequency calculation unit 30d calculates the base frequencies of the periodical noises has been discussed by way of example. Not limited to this, however, the base frequency calculation unit 30d may further calculate intensities of the calculated base frequencies. The intensity calculation is performed, for example, by converting the C values of the peaks P11 and P21 illustrated in FIG. 5 to the intensities (see the vertical axis in FIG. 4).

In this situation, the detection unit 40 detects intensities corresponding to the frequencies obtained by the aforementioned multiplication process with a procedure similar to that by the base frequency calculation unit 30d. Then, the detection unit 40 outputs to the IF noise processor 14 pairs of the frequency and the corresponding intensity together with pairs of the base frequency calculated by the base frequency calculation unit 30d and the corresponding intensity.

The IF noise processor 14 removes the periodic noises, for example, by subtracting the intensities in the received frequencies from the IF signal. In this way, it is possible to remove the periodic noises from the IF signal efficiently. The aforementioned conversion from the C values to the intensities can be carried out by taking a Fourier transform of the cepstrum.

In FIG. 6, the frequency spectrum when the signal detector 22 detects the frequencies and the intensities of the signal group A2 is illustrated as peaks F21, H22, H23, etc. The signal group illustrated in FIG. 6 is equivalent to what is the periodic noise of the base frequency $\Delta I$ extracted from the frequency spectrum illustrated in FIG. 4.

Figure 7:
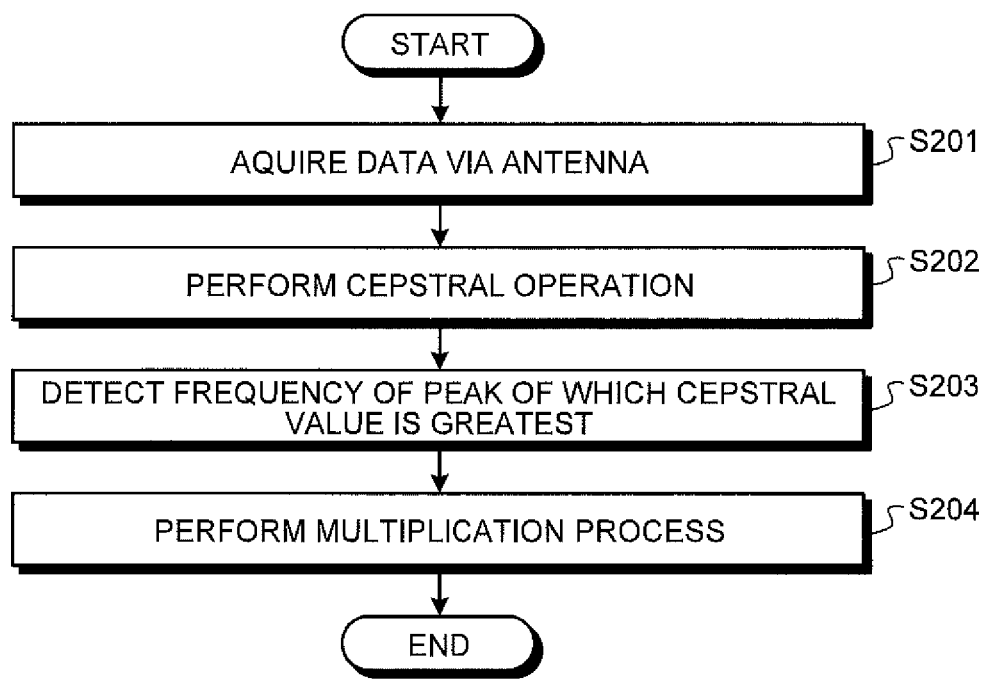
FIG. 7 is a flow chart illustrating a procedure executed by a detection apparatus according to the embodiment.

Then, a procedure executed by the detection apparatus 2 according to the embodiment will be discussed with reference to FIG. 7. FIG. 7 is a flow chart illustrating the procedure executed by the detection apparatus 2 according to the embodiment. As illustrated in the drawing, the acquisition unit 21 acquires, via the antenna 11 positioned on the movable body M, data on which signal groups with different base frequencies are superimposed (Step S201).

The calculation unit 30 performs a cepstral operation on the data acquired by the acquisition unit 21 (Step S202), and then detects a frequency of a peak of which C value (cepstral value) is the greatest in a peak group corresponding to each of the signals (Step S203). Subsequently, the detection unit 40 performs a multiplication process on the frequency of the peak of which C value calculated by the calculation unit 30 is the greatest (Step S204), and then the procedure is ended.

In the aforementioned example of the processing, the case where a cepstral operation is performed on the IF signal from which frequency components of carrier waves are removed has been discussed by way of example. However, not limited to this, the cepstral operation may be performed on the IF signal from which the frequency components of the carrier waves are not removed so that the peaks are detected, ignoring the carrier waves, in the cepstrum. Specifically, carrier waves, for example, in the Japanese domestic AM bands are assigned to 9 K(Hz) intervals, and hence, the peak detection may be conducted, ignoring peak groups of which quefrency is at 1/9 K (1/Hz) intervals in the cepstrum. In this way, it is possible to omit a filtering process of removing the frequency components of the carrier waves and simplify the calculation unit 30.

4. Configuration of Receiving Apparatus according to Modified Example

Although, in the aforementioned embodiment, the case where the receiving apparatus 1 removes the periodic noises from the received data has been illustrated by way of example, the receiving apparatus 1 may extract the periodic noises from the received data. Thus, a modified example of the receiving apparatus 1 will be described below with reference to FIG. 8.

Figure 8:
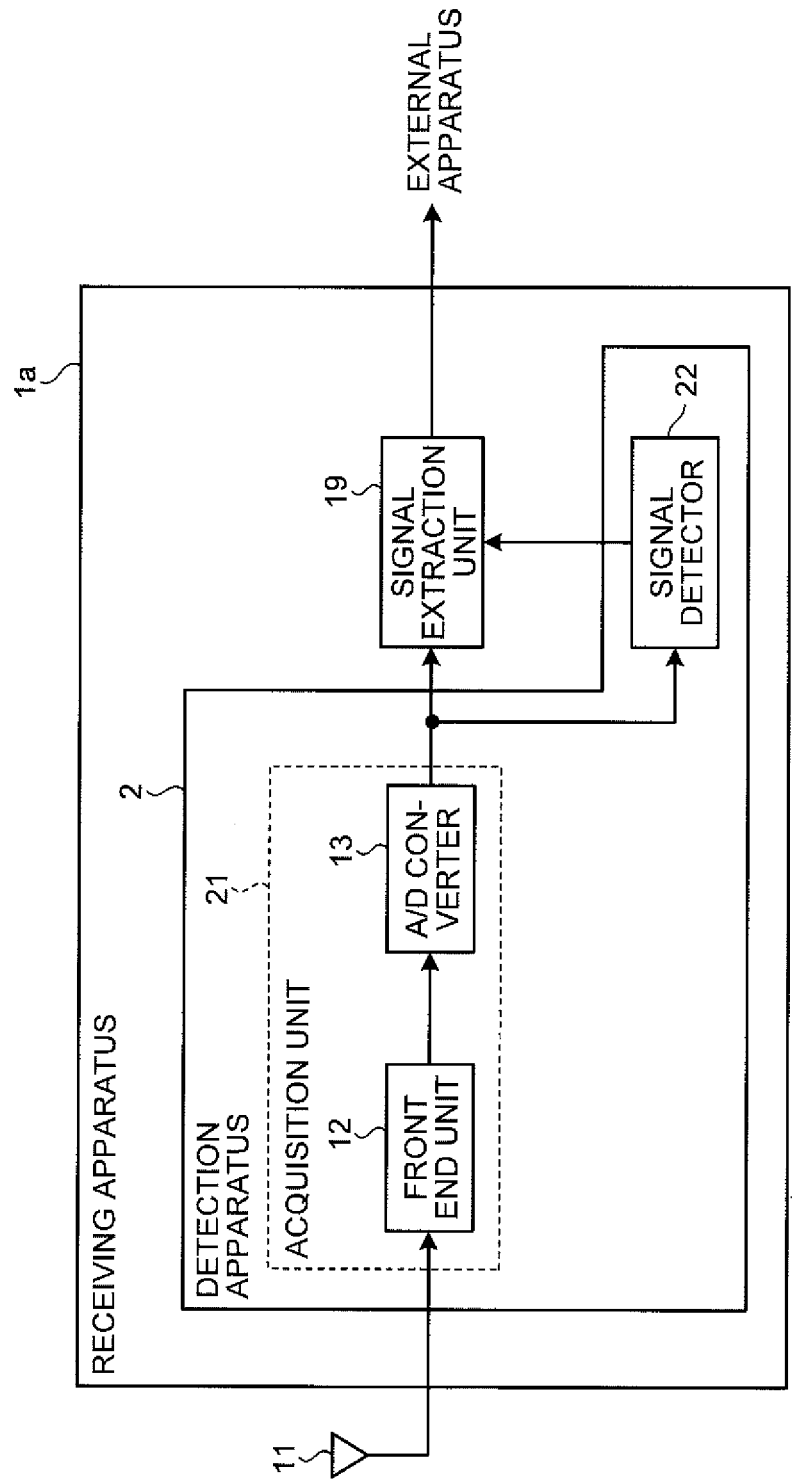
FIG. 8 is a block diagram illustrating an inner configuration of a receiving apparatus according to a modified example.

This modified example is, for example, a modification of the receiving apparatus 1 illustrated in FIG. 2; elements identical with those of the receiving apparatus 1 illustrated in FIG. 2 are denoted by identical reference symbols, and duplicate description is omitted. FIG. 8 is a block diagram illustrating an inner configuration of a receiving apparatus 1a according to the modified example.

As illustrated in FIG. 8, the receiving apparatus 1a according to the modified example includes a detection apparatus 2 and a signal extraction unit 19. The signal extraction unit 19 extracts periodic noises severally from an IF signal based upon a signal with frequencies of periodic noises detected by a signal detector 22, and then outputs the periodic noises to an external apparatus. The external apparatus is, for example, an oscilloscope that indicates an electrical signal of a signal, or the like. For the signal extraction unit 19, an application filter adopting, for example, an optimization algorithm of an LMS (Least Mean Square) algorithm may be used.

As has already been described with reference to FIG. 6, the detection apparatus 2 is capable of detecting intensities of the periodic noises together with the frequencies of the periodic noises in the receiving apparatus 1a according to the modified example as well. In this situation, the receiving apparatus 1a is capable of extracting the intensities of the periodic noises together with the frequencies of the periodic noises from the IF signal.

In this way, the receiving apparatus 1a according to the modified example is adapted to extract from the data the signals detected by the detection apparatus 2. Hence, it is possible to extract signals in signal groups severally with high accuracy.

As has been described, the detection apparatus according to the embodiment includes an acquisition unit, a calculation unit, and a detection unit. The acquisition unit acquires, via an antenna positioned on a movable body, data on which signal groups with different base frequencies are superimposed. The calculation unit calculates the base frequencies of the signal groups severally based upon the frequency spectra of the data acquired by the acquisition unit. The detection unit detects the signals in the signal groups based upon the base frequencies calculated by the calculation unit.

In this way, the detection apparatus according to the embodiment detects the signals in the signal groups based upon the groups' respective base frequencies. Thus, with the detection apparatus according to the embodiment, it is possible to enhance the accuracy of detection of the signals in the signal groups.

Further, although, in the aforementioned embodiment, the blanking process is adopted in removing the noise components of the IF signal, needless to say, some other processing method of removing the noise components would be able to attain the similar effects. Furthermore, although, in the aforementioned embodiments, the radio receiver has been described by way of example, the embodiment may be adopted for a television receiver, a beacon receiver, or the like.

Also, in the aforementioned embodiment, signals in signal groups of different base frequencies are defined as noise. However, not limited to this, the signal groups may be some other signal groups superimposed on a certain signal or a part of a certain signal. Moreover, the signals of different base frequencies contained in the data may be three or more in number.

The elements of each unit illustrated in the drawings do not necessarily have to be physically configured as illustrated. In other words, specific modes of distribution/incorporation of the elements are not limited to what are illustrated in the drawings, or rather, all or part of them are intended to be configured in arbitrary units by functionally or physically distributing/incorporating them, depending upon various types of load or states in use.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detection apparatus comprising:
a processor, the processor programmed to:
acquire, via an antenna positioned on a movable body, data on which signal groups with different base frequencies are superimposed;
calculate, based upon a frequency spectrum of the acquired data, the base frequencies of the respective signal groups; and
detect signals included in each of the signal groups based upon the calculated base frequencies, wherein
the processor is further programmed to:
perform a cepstral operation in which cepstral values are calculated, on the frequency spectrum so as to calculate the base frequencies;
calculate a frequency corresponding to a peak of which the cepstral value is a greatest for each of the signal groups, as the base frequency of a corresponding one of the signal groups: and
perform a multiplication process on the calculated base frequencies so as to detect the signals in each of the signal groups.

2. A detection apparatus comprising:
a processor, the processor programmed to:
acquire, via an antenna positioned on a movable body, data on which signal groups with different base frequencies are superimposed;
calculate, based upon a frequency spectrum of the acquired data, the base frequencies of the respective signal groups, each of the base frequencies corresponding to a greatest peak in a corresponding one of the respective signal groups;
perform a multiplication process on the calculated base frequencies so as to detect the signals in the respective signal groups; and
detect signals included in each of the signal groups based upon the calculated base frequencies, wherein
for each of the signal groups, a fundamental wave of the corresponding base frequency and harmonic waves having frequencies obtained by multiplying the fundamental wave by integers of two or more are detected as the signals included in the corresponding signal group.

3. The detection apparatus according to claim 2, wherein the processor is programmed to:
perform a cepstral operation in which cepstral values are calculated relative to quefrencies that are a variable with a time dimension, on the frequency spectrum so as to calculate the base frequencies; and
calculate a frequency corresponding to a peak having a greatest cepstral value for each of the signal groups, as the base frequency of the corresponding signal group.

4. A receiving apparatus comprising:
a processor, the processor programmed to:
acquire, via an antenna positioned on a movable body, data on which signal groups with different base frequencies are superimposed;
calculate, based upon a frequency spectrum of the acquired data, the base frequencies of the respective signal groups, each of the base frequencies corresponding to a greatest peak in a corresponding one of the respective signal groups;
perform a multiplication process on the calculated base frequencies so as to detect the signals in the respective signal groups; and
detect signals included in each of the signal groups based upon the calculated base frequencies, wherein
for each of the signal groups, a fundamental wave of the corresponding base frequency and harmonic waves having frequencies obtained by multiplying the fundamental wave by integers of two or more are detected as the signals included in the corresponding signal group.

5. The receiving apparatus according to claim 4, wherein the processor is programmed to:
extract from the data the detected signals.

6. The receiving apparatus according to claim 4, wherein the processor is programmed to:
remove from the data the detected signals.

7. A detection method comprising:
acquiring, via an antenna positioned on a movable body, data on which signal groups with different base frequencies are superimposed;
calculating, based upon a frequency spectrum of the data acquired in the acquiring, the base frequencies of the respective signal groups, each of the base frequencies corresponding to a greatest peak in a corresponding one of the respective signal groups;
perform a multiplication process on the calculated base frequencies so as to detect the signals in the respective signal groups; and
detecting signals in each of the signal groups based upon the base frequencies calculated in the calculating, wherein
for each of the signal groups, a fundamental wave of the corresponding base frequency and harmonic waves having frequencies obtained by multiplying the fundamental wave by integers of two or more are detected as the signals included in the corresponding signal group.

* * * * *